United States Patent
Gaunt

[15] 3,656,253
[45] Apr. 18, 1972

[54] FISHING LURE FLASHER

[72] Inventor: Jack R. Gaunt, 1150 Tattershall Drive, Victoria, British Columbia, Canada

[22] Filed: Apr. 15, 1970

[21] Appl. No.: 28,577

[52] U.S. Cl. .......................... 43/42.33, 43/42.51, 43/42.34
[51] Int. Cl. ................................. A01k 85/00, A01k 85/04
[58] Field of Search .............. 350/97; 43/42.33, 42.34, 42.5, 43/42.51

[56] References Cited

UNITED STATES PATENTS

| | | | |
|---|---|---|---|
| 2,608,787 | 9/1952 | Krogue | 43/42.51 |
| 2,765,570 | 10/1956 | Sedivy | 43/42.5 X |
| 3,229,407 | 1/1966 | Quyle | 43/42.5 X |
| 2,056,228 | 10/1962 | Stackhouse | 43/42.51 |

Primary Examiner—Melvin D. Rein
Attorney—Seed, Berry & Dowrey

[57] ABSTRACT

A flasher for use in conjunction with a lure and a hook to catch fish including a base member of a relatively flat, elongated, stiff sheet plastic member having irregularly curved end portions and non-parallel side portions. A portion of each face of the base member is covered by a reflective strip. The base member is provided with an attaching hole at each end disposed along a line passing generally through the longitudinal center of the base member. The end portions of the base member are bent in opposite directions with one of the bends being approximately perpendicular to the said line between the said holes while the other bend is at a small acute angle thereto. The conformation of the flasher is such that when towed through the water, it will spin in large loops at a uniform speed, first in one direction and then in the other, producing an irregular reflective pattern attractive to fish.

4 Claims, 3 Drawing Figures

PATENTED APR 18 1972 3,656,253
FIG. 1
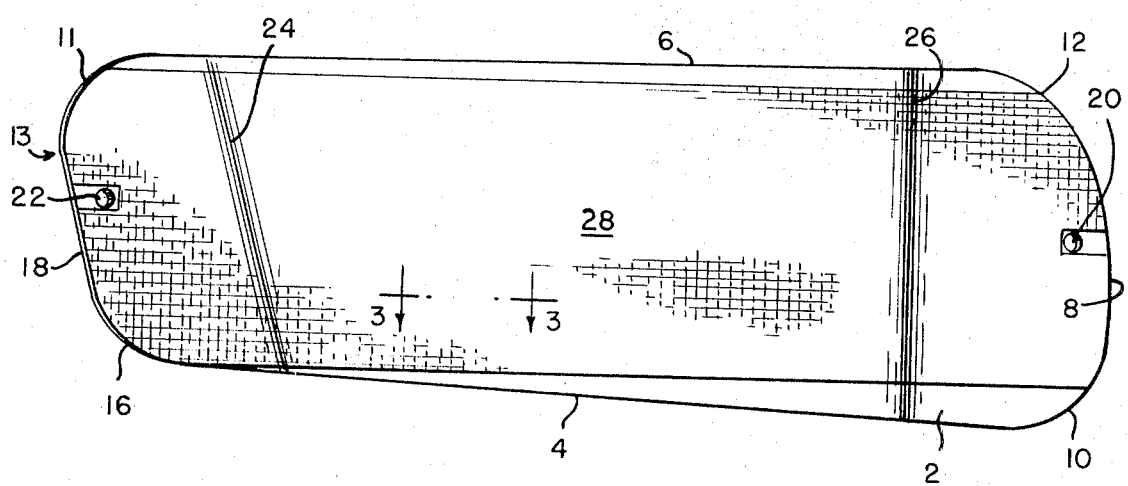
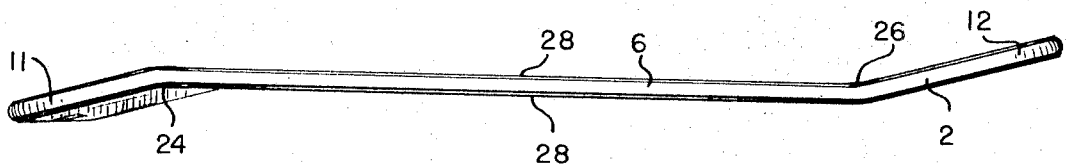
FIG. 2
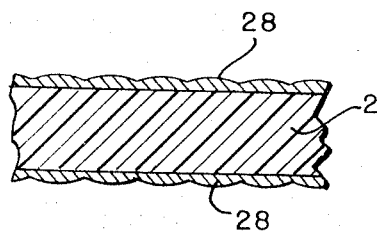
FIG. 3
INVENTOR.
JACK R. GAUNT
BY
Seed, Berry & Dowrey
ATTORNEYS

FISHING LURE FLASHER

BACKGROUND OF THE INVENTION

It is known in the art to use a flasher or herring dodger when fishing for game fish, such as when trolling for salmon. The flasher imparts an erratic behaviour to the lure, making it appear to the intended species that the lure is a crippled feeder fish. In the past, these flashers have been made out of a variety of combinations of metal which suffered the drawbacks of requiring continual care and polishing to retain their reflective nature and further when placed in a jammed tackle box were likely to be subjected to stresses which would alter their configuration, and therefore, their resultant action when again pulled through the water.

SUMMARY OF THE INVENTION

It is an object of the present invention to provide a flasher for use in conjunction with a lure having a hook wherein the flasher imparts an improved or more realistic action to the lure.

In accordance with this object and as a feature of the present invention, there is provided a fishing flasher wherein the shape of the flasher is such that it imparts improved characteristics to the lure, thus greatly enhancing the prospect of attracting a fish.

Another object of the present invention is to provide a fishing flasher which is economical to make.

In accordance with this object, there is provided a fishing flasher wherein the base material is a molded plastic which is inexpensive and easy to handle, the finished flasher including a reflective substance.

Yet another object of the present invention is to provide a fishing flasher which will retain its shape and attractive characteristics without a great deal of maintenance or care.

In accordance with this object and as a feature of the present invention, the base material is of a relatively stiff, tough material and the reflective material is of a permanent reflective character.

BRIEF DESCRIPTION OF THE DRAWINGS

FIG. 1 is a plan view of the inventive flasher;
FIG. 2 is an elevational view of the inventive flasher; and
FIG. 3 is a partial sectional view along lines 3—3 of FIG. 1.

DESCRIPTION OF THE PREFERRED EMBODIMENT

As seen in FIGS. 1 and 2, the flasher or herring dodger comprises a base member 2 which would be formed of a molded plastic such as butyrate which preferably would have some color imparted thereto. The base member, although being irregular in shape, is elongated. The sides 4 and 6 are non-parallel, generally flaring out towards the end 8 which is irregularly curved, having a much sharper corner at one portion 10 than at its opposite portion 12. The opposite or narrow end 13 of the flasher is likewise of an irregularly curved configuration having its sharper corner 14 approximately on a diagonal from the corner 10 and its more rounded corner 16 approximately on a diagonal from the rounded corner 12 of the opposite end 8. The two ends 8 and 13 likewise are not similar in shape, the major portion of end 8 being of a continual smooth curve whereas the end 13 being of a smooth curve at corners 14 and 16 but joined by an essentially straight portion 18.

The plastic base member likewise has formed therein a pair of holes 20, 22 adapted to receive split rings for attachment of the flasher to swivels and thusly to the remainder of the fishing line.

To assist in imparting the desired action to the dodger, there is in addition to the irregular shape of the outline of the dodger, a pair of bends imparted to the base member 2. Adjacent to but spaced from end 13 there is a bend 24 which, as can be seen in FIG. 1, runs generally parallel to the straight surface 18 of end 13 and angularly across the base member 2. At the opposite end there is a bend 26 in the opposite direction which is generally perpendicular to a line extending between the holes 20, 22, likewise spaced from the end of the base member.

It is to be noted that the particular substance used for the base member in the preferred embodiment, i.e. a molded plastic such as butyrate, is not intended to limit the invention and any relatively stiff and yet flexible material capable of retaining a given shape could equally well be used. All that is needed is a substance that will retain its configuration when battered around in the tackle box and yet flex when under stress so that it will not snap. Likewise, it is to be noted that the color imparted to the plastic material should be uniformly distributed through the material so that scratches or other deformations to the surface will not detract from the overall coloring of the base member.

One of the objects of a flasher is to attract the attention of the designated sports fish so that he will then be drawn to the lure and captured. To attract the attention of the sports fish there is a need for a reflective surface similar to that seen in the fish scales of most sport fish. To impart the reflective nature to applicant's flasher, there is adhered to each surface thereof a thin metallic strip 28 having generally parallel sides and extending from end 13 to end 8.

In the interest of having a flasher which is of a durable material and yet requires little maintenance, the reflective strip will be preferably either a chrome vinyl tape or an aluminum tape such as an adhesive back reflective Mylar. The tape could well be smooth, but the preferred embodiment depicts a waffled tape, best seen in FIG. 3.

Referring again to FIG. 1, it can be seen that the tape 28 does not cover the entire base member 2 since the sides are parallel, but leaves an irregularly shaped portion extending beyond the tape which, as noted above, would have a color imparted thereto. In action, the flasher would not only give a reflective flash but also a continually varying and contrasting image. The varying impression is the result of the tape and colored base member combination rotating and spinning as a result of the configuration while being pulled through the water.

The embodiments of the invention in which an exclusive property or privilege is claimed are defined as follows:

1. A flasher for use in conjunction with a lure to catch fish, said flasher comprising;
    a relatively flat elongated base member of molded plastic, said base member having nonparallel, generally straight side edges, a curved end portion the opposite end portion presenting a curved and inclined edge connected to said side edges by curved portions, said base member having a hole at each end to accommodate an attaching ring along a line passing generally through the longitudinal center of the base member, said base member further including end portions bent in opposite directions with at least one of said bends being approximately perpendicular to a line between the attaching holes and the other bend being at a small acute angle to said line and
    a sheet of metallic reflector tape upon each side of the base member, said tape covering substantially the entire surface of the base member whereby, when the flasher is being towed through the water it will spin in large loops at a uniform speed, first in one direction and then in the other producing an irregular reflective pattern attractive to fish.

2. A flasher as in claim 1 wherein the base material is colored to contrast with the reflective material greatly increasing the attraction for the fish.

3. A flasher as in claim 1 wherein one end has a surface generally parallel to the bend at that end of the flasher.

4. A flasher as in claim 1 wherein the reflective portion has an uneven surface.

* * * * *